US012728938B2

(12) United States Patent
Thorén et al.

(10) Patent No.: US 12,728,938 B2
(45) **Date of Patent: *Sep. 8, 2026**

(54) TRACK ASSEMBLY FOR A TRACKED VEHICLE

(71) Applicant: BAE Systems Hägglunds Aktiebolag, Örnsköldsvik (SE)

(72) Inventors: Max Thorén, Örnsköldsvik (SE); Björn Hellholm, Arnäsvall (SE); Filip Byberg, Linköping (SE)

(73) Assignee: BAE Systems Hägglunds Aktiebolag, Örnsköldsvik (SE)

( * ) Notice: Subject to any disclaimer, the term of this patent is extended or adjusted under 35 U.S.C. 154(b) by 314 days.

This patent is subject to a terminal disclaimer.

(21) Appl. No.: 18/551,549

(22) PCT Filed: Mar. 24, 2022

(86) PCT No.: PCT/SE2022/050283

§ 371 (c)(1),
(2) Date: Sep. 20, 2023

(87) PCT Pub. No.: WO2022/203583

PCT Pub. Date: Sep. 29, 2022

(65) Prior Publication Data

US 2024/0294217 A1 Sep. 5, 2024

(30) Foreign Application Priority Data

Mar. 25, 2021 (SE) .................................... 2150355-2

(51) Int. Cl.
*B62D 55/10* (2006.01)
*B62D 55/125* (2006.01)
*B62D 55/104* (2006.01)

(52) U.S. Cl.
CPC ........... *B62D 55/10* (2013.01); *B62D 55/125* (2013.01); *B62D 55/104* (2013.01)

(58) Field of Classification Search
CPC .... B62D 55/10; B62D 55/104; B62D 55/125; B62D 55/14; B62D 55/13; B60K 17/06;
(Continued)

(56) References Cited

U.S. PATENT DOCUMENTS 3,534,636 A * 10/1970 Lorence .................... F16H 1/32 475/176
3,580,345 A 5/1971 Brown
(Continued)

FOREIGN PATENT DOCUMENTS

CA 907665 A 8/1972
CN 101175663 A * 5/2008 ............... B60K 7/00
(Continued)

OTHER PUBLICATIONS

International Search Report and Written Opinion mailed Apr. 22, 2022, directed to International Application No. PCT/SE2022/050283; 13 pages.

(Continued)

*Primary Examiner* — John Olszewski
*Assistant Examiner* — Matthew D Lee
(74) *Attorney, Agent, or Firm* — Morrison & Foerster LLP

(57) ABSTRACT

Disclosed is a track assembly comprising a track support beam for supporting road wheels, a drive wheel member, a drive arrangement for drive wheel member operation and an endless track disposed around said road wheels and drive wheel member. Said drive arrangement comprises a drive unit for drive wheel member drive, and a brake arrangement for braking of the drive wheel member. Said track support beam has an outer side facing away from a vehicle body and an inner side facing towards said vehicle body when said track assembly is connected to the vehicle body. Said drive arrangement comprises a drive axle coaxially arranged rela-
(Continued)

tive to a centre axis of said drive wheel member for rotating said drive wheel member. Said brake arrangement is configured to journal in bearings in connection to an outer portion of the drive axle protruding from the outer side of said track support beam.

17 Claims, 9 Drawing Sheets

(58) Field of Classification Search
CPC .... B60K 2007/0046; B60K 2007/0061; B60K 7/0007; B60W 2300/44; B60Y 2200/25; B60G 2300/32
See application file for complete search history.

(56) References Cited

U.S. PATENT DOCUMENTS 4,201,279 A 5/1980 Fukui
4,245,724 A 1/1981 Beck
4,291,779 A 9/1981 Mann et al.
2010/0060075 A1* 3/2010 Hansen ................ B62D 55/084 305/15
2012/0097462 A1 4/2012 Graner
2013/0233629 A1* 9/2013 Fitch ...................... B62D 55/12 180/9.1
2014/0305719 A1 10/2014 Graner et al.
2016/0031499 A1* 2/2016 Metzger ................. B62D 55/06 180/9.42
2016/0083028 A1* 3/2016 Hellholm ............... B62D 55/14 180/9.42
2017/0059003 A1* 3/2017 Wagh ........................ F16H 1/46
2018/0112530 A1* 4/2018 Fliearman ................. F03C 1/06
2018/0251171 A1* 9/2018 Thomas ............... B62D 55/104
2020/0189672 A1* 6/2020 Gnedov ................. B62D 55/14
2021/0107575 A1* 4/2021 Van Mill ................ B62D 55/14
2021/0179170 A1* 6/2021 Cowper .................... E02F 3/84
2021/0188066 A1* 6/2021 McGrew .................. B60K 1/02

FOREIGN PATENT DOCUMENTS

CN 102211620 A 10/2011
CN 203473042 U 3/2014
CN 110546025 A 12/2019
DE 1962118 A1 6/1971
DE 102019203385 A1 9/2020
GB 2055336 A 3/1981
WO 2004/016494 A1 2/2004
WO WO-2018222105 A1 * 12/2018 ............... B60K 7/00

OTHER PUBLICATIONS

Office Action dated Oct. 29, 2021, directed to SE Application No. 2150355-2; 8 pages.
Extended European Search Report dated Jan. 24, 2025, directed to EP Application No. 22776232.5; 14 pages.
Search Report dated Apr. 7, 2026, directed to CN Application No. 202280023438.4; 5 pages.

* cited by examiner

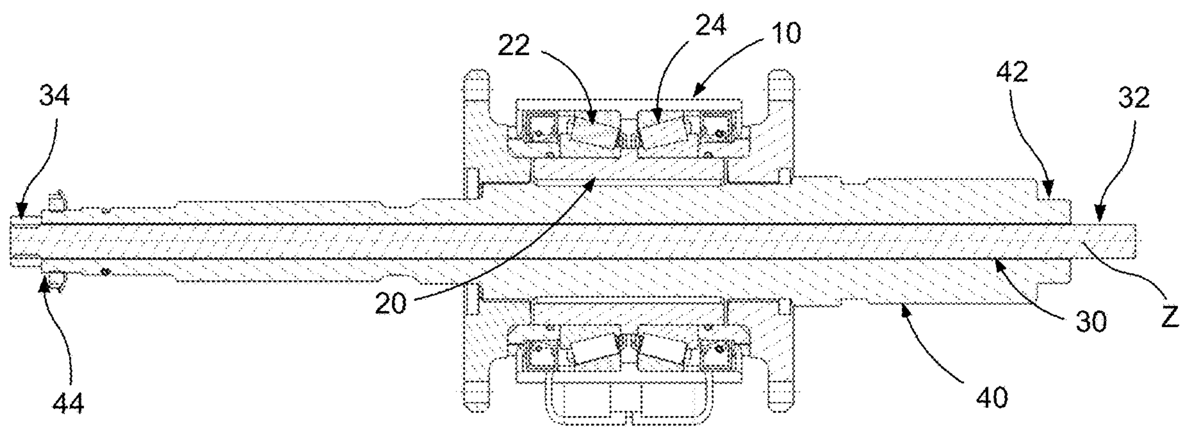
FIG. 9A
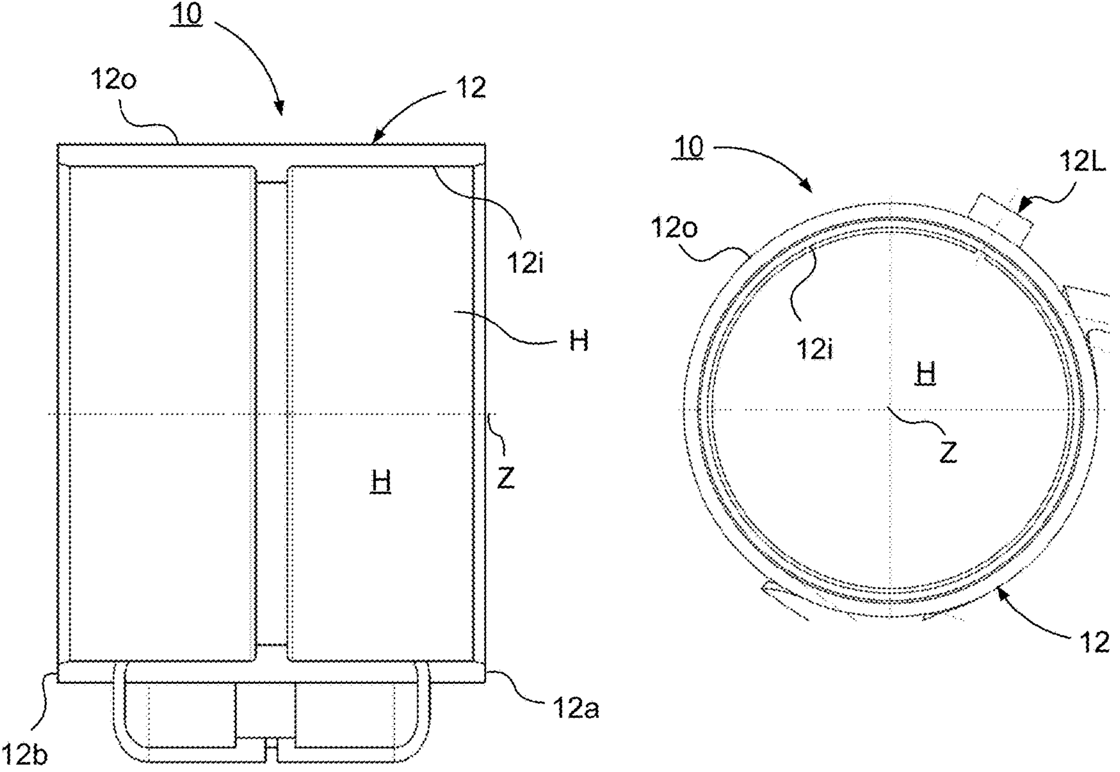
FIG. 9B
FIG. 9C

TRACK ASSEMBLY FOR A TRACKED VEHICLE

CROSS-REFERENCE TO RELATED APPLICATIONS

This application is a U.S. national stage application under 35 U.S.C. § 371 of International Application No. PCT/SE2022/050283, filed Mar. 24, 2022, which claims the priority of SE Application No. 2150355-2, filed Mar. 25, 2021, the entire contents of each priority application is incorporated herein by reference.

FIELD OF THE DISCLOSURE

The present invention relates to a track assembly for a tracked vehicle. The present invention relates to a tracked vehicle comprising at least one such track assembly.

BACKGROUND OF THE DISCLOSURE

Tracked vehicles may comprise a pair of track assemblies, where each track assembly of the pair of track assemblies comprises a track support beam, a drive wheel member, a plurality of road wheels and an endless track running over the drive wheel member and said plurality of road wheels. Said drive wheel member and said plurality of road wheels are rotatably secured to said track support beam. A drive unit of a drive arrangement of said tracked vehicle may be configured to drive a drive axle which in turn is configured to rotate said drive wheel member which is arranged to drive said endless track so as to propel the tracked vehicle.

There is however a need to present improvements for track assemblies for tracked vehicles.

OBJECTS OF THE INVENTION

An object of the present invention is to provide a track assembly for a tracked vehicle which facilitates access to parts and of, and assembly and disassembly of, drive arrangement of said track assembly.

Another object of the present invention is to provide a tracked vehicle with at least one such track assembly.

SUMMARY OF THE DISCLOSURE

These and other objects, apparent from the following description, are achieved by a track assembly for a tracked vehicle, and a tracked vehicle as set out in the appended independent claims. Preferred embodiments of the track assembly are defined in appended dependent claims.

Specifically an object of the invention is achieved by a track assembly for a tracked vehicle. Said track assembly is configured to be connected to a vehicle body of said vehicle. Said track assembly comprises a track support beam configured to support a plurality of road wheels, a drive wheel member, and a drive arrangement for operating said drive wheel member, said drive wheel member being configured to be rotated about a centre axis. An endless track is disposed around said road wheels and drive wheel member. Said drive arrangement comprises a drive unit for driving said drive wheel member, and a brake arrangement for providing a braking function of the drive wheel member of the track assembly. Said track support beam has an outer side configured to face away from the vehicle body and an opposite inner side configured to face towards said vehicle body when said track assembly is connected to the vehicle body. Said drive arrangement comprises a drive axle configured to be coaxially arranged relative to said centre axis of said drive wheel member for rotating said drive wheel member. Said brake arrangement is configured to be journaled in bearings in connection to an outer portion of the drive axle protruding from the outer side of said track support beam. Said outer portion of said drive axle is protruding in the axial direction from the outer side of said track support beam.

Hereby a track assembly with a drive arrangement where easy access to essential parts such as brake arrangement and associated parts is facilitated. Hereby a track assembly with a drive arrangement facilitating easy assembly and disassembly may be provided.

According to an aspect of the present disclosure, said brake arrangement comprises a brake housing configured to provide an enclosure for brake members of said brake arrangement, wherein said brake arrangement is configured to be journaled in bearings in connection to said portion of the drive axle axially protruding from the outer side of said track support beam so as to allow rotation of said drive axle relative to said brake housing.

According to an embodiment of said track assembly, said drive axle is configured to be journaled in bearings in said track support beam so as to allow rotation of said drive wheel member relative to said track support beam, wherein said drive axle is configured to run through said track support beam, to the outer side, providing said outer portion of the drive axle. By thus arranging said drive axle so that it is journaled in bearings in said track support beam, the drive arrangement may be efficiently supported, e.g. by means of a bearing configuration, in said track support beam. Hereby said drive axle of said drive arrangement essentially coaxially coincides with the centre axis of the drive wheel member, whereby efficient and radially compact drive unit may be provided by means of said track assembly, facilitating high operational reliability and efficiency when utilized in a tracked vehicle. Such a solution may easily and efficiently be applied to existing track assemblies, and be used for existing drive wheel members.

According to an embodiment of said track assembly, said brake arrangement comprises a torque arm configured to be connected to said track support beam so as to essentially prevent rotation of said brake arrangement about said centre axis. Hereby a radially compact drive arrangement may be provided, which facilitates efficient function of said brake arrangement in connection to braking function associated with drive and/or parking.

According to an embodiment of said track assembly, said torque arm is configured to provide torque resistance in connection to a brake action associated with said drive axle by means of said brake arrangement. Hereby a radially compact drive arrangement may be provided, which facilitates efficient function of said brake arrangement in connection to braking function associated with drive and/or parking.

According to an embodiment of said track assembly, said drive arrangement comprises a centre support bar configured to coaxially coincide with the centre axis of said drive wheel member, said centre support bar being configured to supportingly connect said brake arrangement with said drive unit. Hereby easy assembly and disassembly is facilitated. Hereby easy axial assembly and disassembly is facilitated. Hereby a radially compact solution may be provided, wherein existing drive wheel members may be easily applied to the drive arrangement for efficient operation.

According to an embodiment of said track assembly, said centre support bar is configured to run through said drive axle so as to coaxially provide said connection of said drive unit and brake arrangement. Hereby easy assembly and disassembly is facilitated. Hereby easy axial assembly and disassembly is facilitated. Hereby a radially compact solution may be provided, wherein existing drive wheel members may be easily applied to the drive arrangement for efficient operation.

According to an embodiment of said track assembly, said drive axle has an inner portion axially protruding from the inner side of said track support beam into a transmission device of said drive unit, wherein said centre support bar running through said drive axle is configured to be connected to said transmission device. Hereby easy assembly and disassembly is facilitated. According to an aspect of the present disclosure, and end portion of said centre support bar is configured to provide said connection of said drive unit and brake arrangement by means of connecting said end portion to said transmission device. According to an aspect of the present disclosure, said end portion of said centre support bar is configured to connect to a portion of a gear carrier of said transmission device configured to transfer torque from said transmission device to said drive axle, said centre support bar being connected to said gear carrier so that it rotates with the portion of the gear carrier and hence with the drive axle. According to an aspect of the present disclosure, said end portion is configured to be fastened to said portion of said gear carrier by means of a screw joint configuration. According to an aspect said end portion of said central support bar comprises or is constituted by a screw joint member configured to be screwed into a threaded opening of said portion of said gear carrier for providing said connection.

According to an embodiment said track assembly further comprises a fastening arrangement configured to be arranged in connection to an outer end portion of said brake arrangement so as to facilitate assembly and disassembly of said drive arrangement associated with said brake arrangement. By thus providing such a fastening arrangement at the outer end portion of said brake arrangement, easy assembly and disassembly of said drive arrangement associated with said brake arrangement may be provided.

According to an embodiment of said track assembly, said fastening arrangement comprises a first fastening member configured to provide attachment of said centre support bar when arranged through said drive axle, said centre support bar being configured to be removably attached by means of said fastening member. Hereby assembly and disassembly of said drive arrangement associated with said brake arrangement may be provided in an easy and efficient way by simply attaching said centre support bar by means of said first fastening member, e.g. a joint member such as a bolt joint member.

According to an embodiment of said track assembly, said fastening arrangement comprises a second fastening member configured to be arranged around said drive axle so as to provide a locking function for preventing axial movement of the brake arrangement. Hereby locking of said brake arrangement so that it does not move in the axial direction may be provided in an easy and efficient way by simply attaching said second fastening member around the drive axle, providing a stop for said brake arrangement.

According to an embodiment of said track assembly, said brake arrangement comprises a brake housing configured to provide an enclosure for brake members of said brake arrangement, said housing having a first end portion configured to face said track support beam and an opposite second end portion configured to face away from said track support beam, said second end portion having a central opening for accessing said fastening arrangement so as to facilitate assembly of said brake arrangement to said track assembly and disassembly of said brake arrangement from said track assembly. By thus providing such a brake housing with said central opening, easy access of said fastening arrangement at the outer and portion of said brake arrangement is provided, whereby easy assembly and disassembly of said drive arrangement associated with said brake arrangement may be provided.

According to an embodiment of said track assembly, said brake arrangement comprises a closure element for closing said opening, said closure element being operable between an open position for facilitating access to said fastening arrangement, and a closed position in which said enclosure is provided. By thus providing such a closure element for opening and closing said central opening, easy access of said fastening arrangement at the outer end portion of said brake arrangement is provided for easy assembly and disassembly of said drive arrangement associated with said brake arrangement in the open position, and hermetic sealing of said brake arrangement may be provided in said closed position.

According to an embodiment of said track assembly, said brake arrangement further comprises a hollow brake axle configured to be arranged around said drive axle so that the brake axle is rotated by means of said drive axle, wherein said brake housing is configured to be journaled in bearings to said brake axle such that said journaling in bearings in connection to said outer portion of the drive axle is provided when said brake arrangement is connected to said drive axle. By thus providing a brake arrangement with such a hollow brake axle arranged around said drive axle, a radially compact drive arrangement with a radially compact brake arrangement may be provided, which facilitates efficient function of said brake arrangement in connection to braking function associated with drive and/or parking.

According to an embodiment of said track assembly, said brake arrangement, in the direction essentially perpendicular to the longitudinal direction and the transversal direction of the endless track is configured to be arranged within the periphery of the endless track. Hereby a compact brake arrangement, which, when being easily accessible from the outer side of said track support beam, does not extend outside of said endless track of the track assembly.

According to an embodiment of said track assembly, said drive arrangement is configured to be coaxially arranged relative to said centre axis of said drive wheel member. Hereby a radially compact solution may be provided.

According to an embodiment of said track assembly, said drive wheel member comprises an outer drive wheel arranged in connection to the outer side of the track support beam and an inner drive wheel arranged in connection to the inner side of the track support beam, wherein said journaling in bearings of said drive axle is centrally arranged, in said track support beam, between said outer drive wheel and inner drive wheel. Hereby a radially compact solution may be provided, wherein existing drive wheel members may be easily applied to the drive arrangement for efficient operation.

Specifically an object of the invention is achieved by a tracked vehicle comprising at least one track assembly as set out herein.

According to an embodiment, said tracked vehicle comprises a left track assembly, a right track assembly and a vehicle body, wherein said track assemblies are suspendedly arranged to said vehicle body by means of a suspension arrangement.

The tracked vehicle may comprise one or more tracked vehicle units. The tracked vehicle comprises according to an embodiment more than one tracked vehicle unit, said vehicle units being articulately connected to each other.

According to an embodiment, said tracked vehicle is an articulated tracked vehicle comprising a first vehicle unit and a second vehicle unit pivotably connected to the first vehicle unit via an articulation joint, each of said vehicle units comprising a vehicle body and track assembly pair suspendedly connected to respective vehicle body.

BRIEF DESCRIPTION OF THE FIGURES

For a better understanding of the present disclosure reference is made to the following detailed description when read in conjunction with the accompanying drawings, wherein like reference characters refer to like parts throughout the several views, and in which:

FIG. 9A schematically illustrates the cross sectional view of a front portion of the track support beam with a bearing configuration arranged within said front portion, with a cross section of a drive axle journaled in bearings of said bearing configuration, according to an embodiment of the present disclosure;

FIG. 9B schematically illustrates a cross sectional view of the front portion of the track support beam in FIG. 9A, according to an embodiment of the present disclosure; and, FIG. 9C schematically illustrates a side view of the front portion of the track support beam in FIG. 9B, according to an embodiment of the present disclosure.

DETAILED DESCRIPTION OF THE DISCLOSURE

Hereinafter the term "track support beam" refers to a structural element arranged to support ground-engaging means such as e.g. an endless track as well as drive wheel member and road wheels.

Hereinafter the term "track assembly" refers to a unit of the tracked vehicle comprising track support beam, drive wheel member and road wheels as well as a circumferential endless track, which unit is arranged to comprise ground-engaging means and configured to propel the vehicle and thus form at least part of a drive configuration of the tracked vehicle.

Hereinafter the term "track assembly pair" refers to opposite track assemblies of a vehicle unit of the vehicle, one track assembly constituting a right track assembly and the opposite track assembly constituting a left track assembly.

Hereinafter the term "articulated vehicle" refers to a vehicle with at least a front and a rear vehicle unit, which vehicle units are pivotable relative to each other about at least one joint.

Hereinafter the term "vehicle body" refers to any structure of a vehicle configured to be supported by track assemblies of a tracked vehicle and may comprise or constitute the vehicle chassis. The term "vehicle body" may refer to a vehicle frame, one or more beams or the like. The term "vehicle body" may refer to chassis of the vehicle and bodywork.

Hereinafter the term "centre axis", when referring to said drive wheel member being configured to be rotated about a centre axis, refers to the axis about which a drive wheel member of a track assembly is configured to rotate, and hence to an axis running in the transversal direction and perpendicular to the longitudinal direction of the endless track of said track assembly.

Figure 1A:
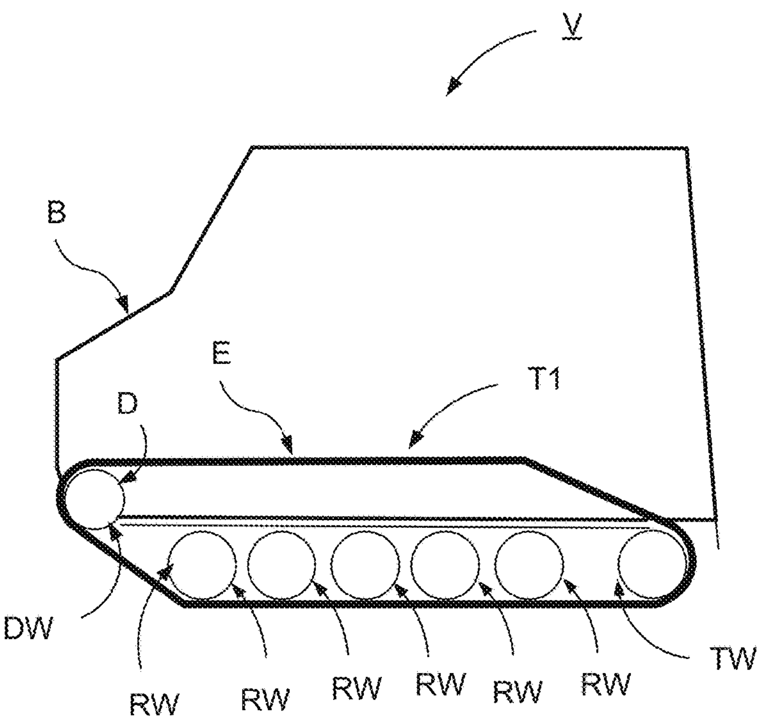
FIG. 1A schematically illustrates a side view of a tracked vehicle comprising track assembly according to an embodiment of the present disclosure.

FIG. 1A schematically illustrates a side view of a tracked vehicle V according to an embodiment of the present disclosure.

The tracked vehicle V comprises a vehicle body B, which according to an aspect of the present disclosure comprises the chassis of the vehicle V and bodywork.

The tracked vehicle V comprises a left track assembly T1 and a right track assembly for driving the vehicle V, the left track assembly T1 being shown in FIG. 1A. Each track assembly comprises a drive wheel member DW, a tension wheel TW, a set of road wheels RW and an endless track E arranged to run over said wheels. The endless track E is thus arranged to be disposed around said wheels. Here the drive wheel member DW is arranged in the front, the tension wheel TW is arranged in the back and the road wheels RW are arranged between the drive wheel member DW and the tension wheel TW. The tracked vehicle according to the present disclosure may however have track assemblies with any suitable arrangement of drive wheel member, tension wheel and road wheels. According to an aspect of the present disclosure the tension wheel may be arranged in the front, the drive wheel member arranged in the back and the road wheels arranged there between.

The endless track E of the respective track assembly is arranged to be driven and hence rotated by means of said drive wheel member DW. The respective track assembly T1 of the tracked vehicle V comprises a drive arrangement D for operating and hence driving said drive wheel member DW. The drive arrangement D is configured to be coaxially arranged relative to the drive wheel member DW.

Figure 1B:
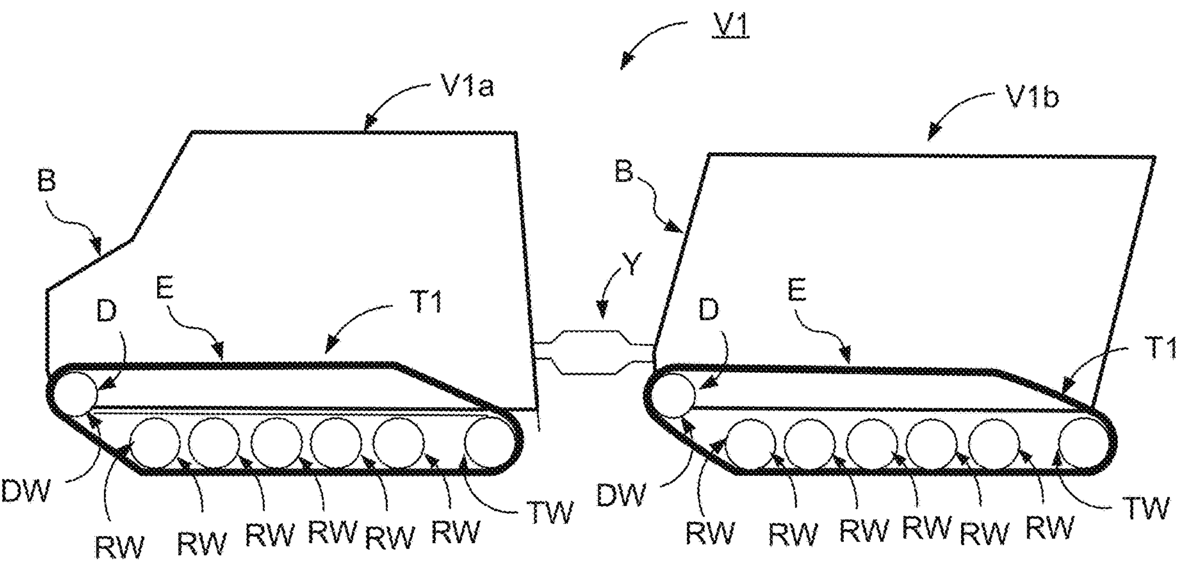
FIG. 1B schematically illustrates a side view of an articulated tracked vehicle comprising track assemblies according to an embodiment of the present disclosure.

FIG. 1B schematically illustrates a side view of a tracked vehicle V1 according to an embodiment of the present disclosure.

Said tracked vehicle V1 is an articulated tracked vehicle V1 comprising a first vehicle unit V1*a* and a second vehicle unit V1*b* pivotably connected to the first vehicle unit V1*a* via an articulation joint Y. Each of said vehicle units V1*a*, V1*b* comprises a vehicle body B and track assembly pair T1 suspendedly connected to respective vehicle body B, the left track assembly T1 of the respective vehicle unit V1*a*, V1*b* being shown.

Each track assembly comprises a drive wheel member DW, a tension wheel TW, a set of road wheels RW and an endless track E arranged to run over said wheels. The endless track E is thus arranged to be disposed around said wheels. Here the drive wheel member DW is arranged in the front, the tension wheel TW is arranged in the back and the road wheels RW are arranged between the drive wheel member DW and the tension wheel TW.

The endless track E of the respective track assembly of the respective vehicle unit V1*a*, V1*b* of said tracked vehicle V1 is arranged to be driven and hence rotated by means of said drive wheel member DW. The respective track assembly T1 of the vehicle units V1*a*, V1*b* of said tracked vehicle V1 may comprise a drive arrangement D for operating and hence driving said drive wheel member DW. The drive arrangement D is configured to be coaxially arranged relative to the drive wheel member DW.

Figure 2:
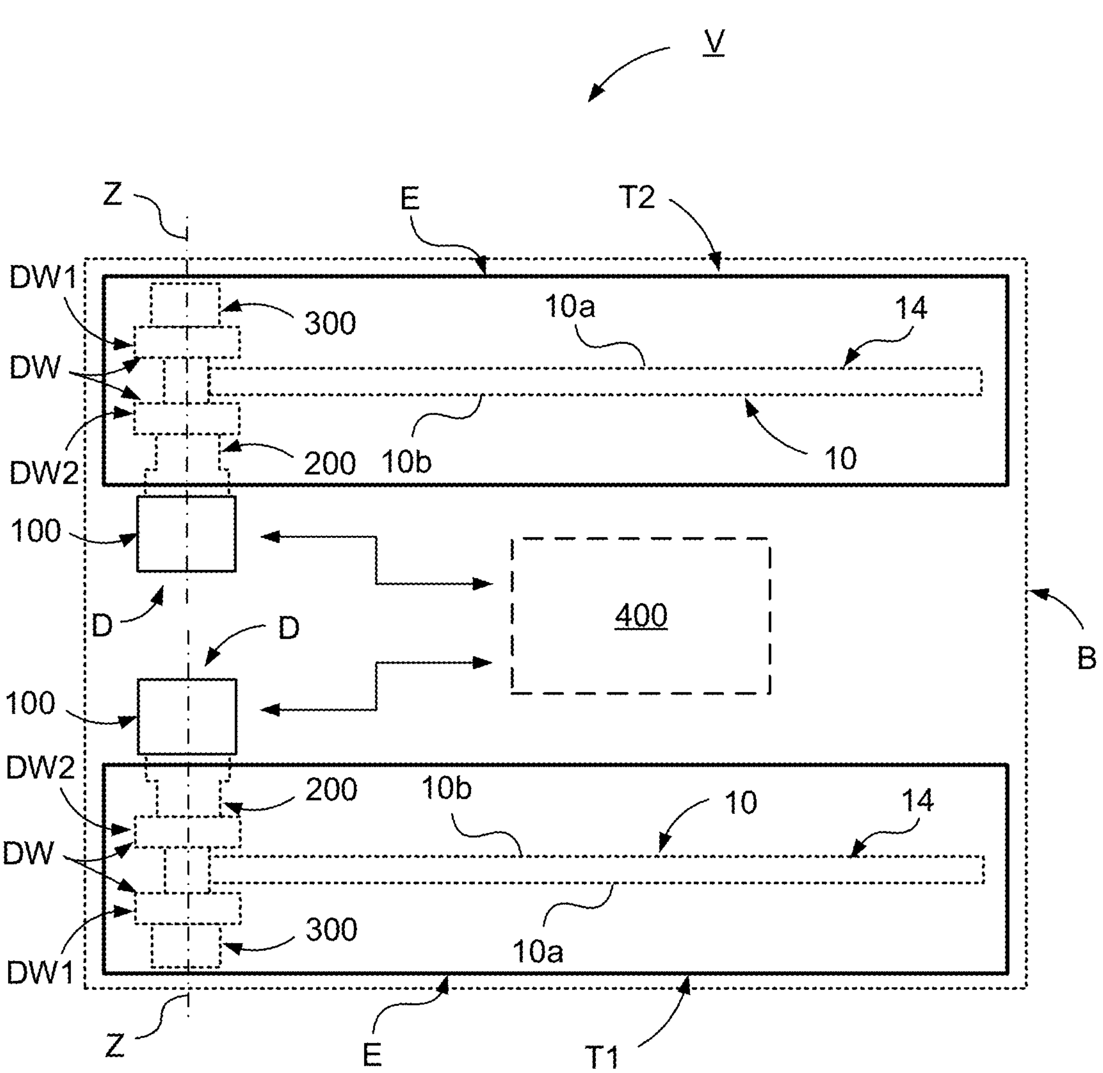
FIG. 2 schematically illustrates a plan view of a tracked vehicle with track assemblies comprising a drive arrangement according to an embodiment of the present disclosure.
Figure 3A:
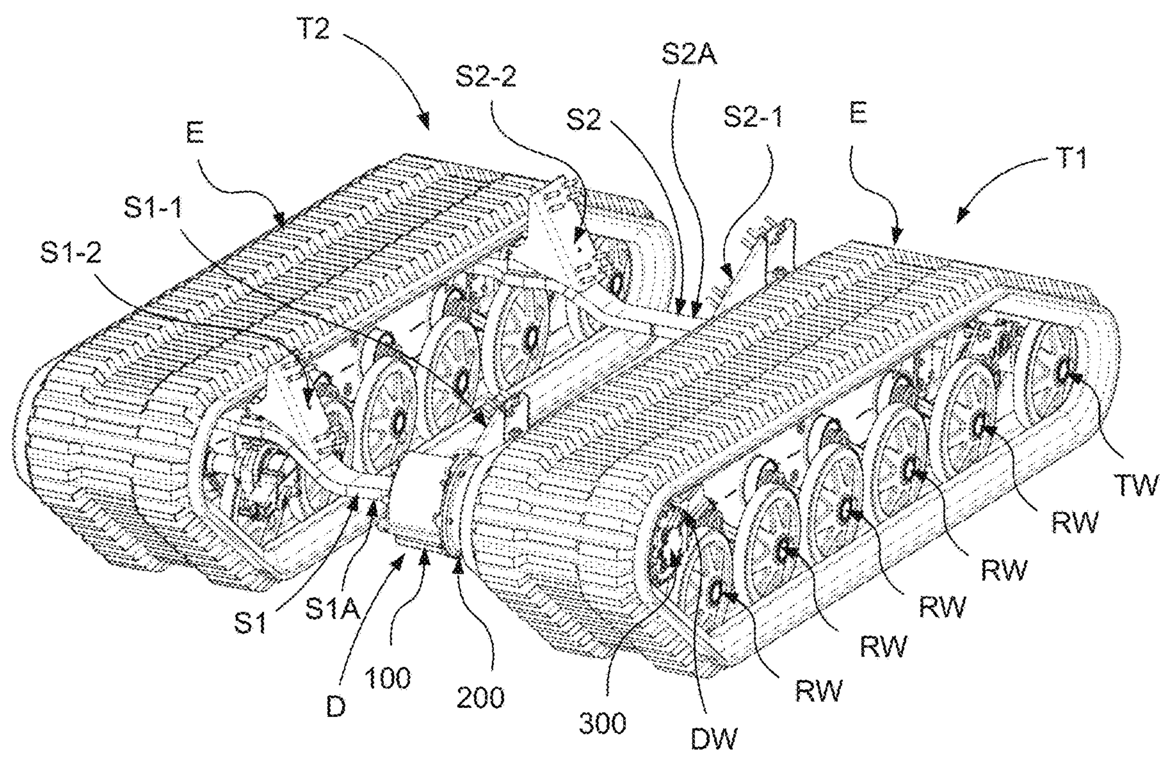
FIG. 3A schematically illustrates a perspective view of a pair of track assemblies of a tracked vehicle according to an embodiment of the present invention.
Figure 3B:
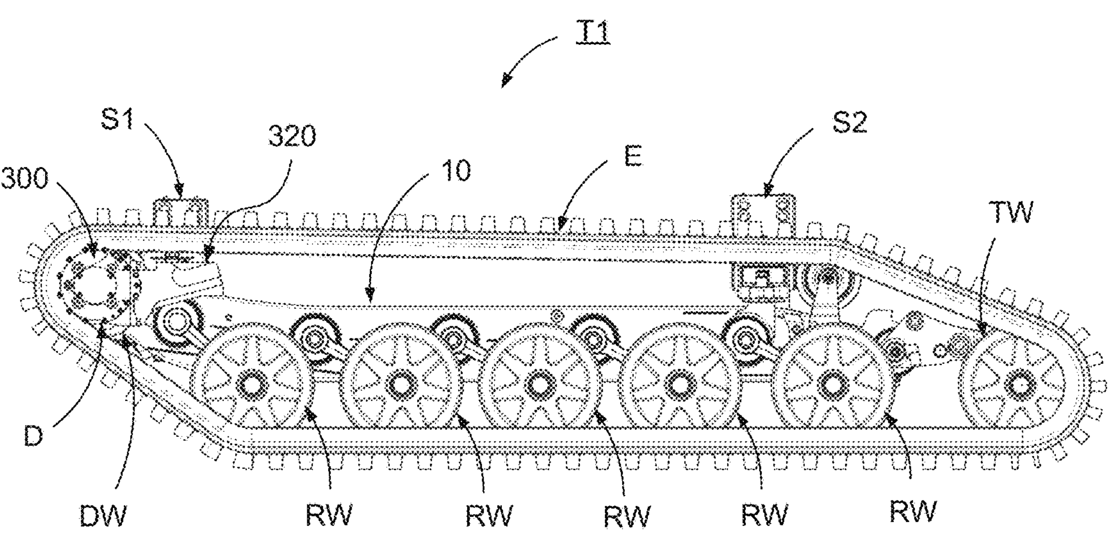
FIG. 3B schematically illustrates a side view of a track assembly in FIG. 3A.

FIG. 2 schematically illustrates a plan view of the tracked vehicle V in FIG. 1A according to an embodiment of the present disclosure. FIG. 3A schematically illustrates a perspective view of a track assembly pair T1, T2 of a tracked vehicle and FIG. 3B schematically illustrates a side view of the left track assembly T1 in FIG. 3A.

The tracked vehicle V comprises a left track assembly T1, a right track assembly T2 and a vehicle body B. The left and right track assemblies T1, T2 provides a track assembly pair T1, T2. Said tracked vehicle V is thus configured to comprises a pair of track assemblies T1, T2 configured to be arranged to suspendedly support said vehicle body B of said vehicle so as to allow relative movement between said vehicle body B and each track assembly T1, T2. The respective track assembly T1, T2 has a longitudinal extension configured to run in the longitudinal extension of the vehicle V, when assembled to the vehicle body B.

Said track assemblies T1, T2 are suspendedly arranged to said vehicle body by means of a suspension arrangement S1, S2, see e.g. FIG. 3A. The suspension arrangement according to the present disclosure may be any suitable suspension arrangement for suspendedly support said vehicle body.

The left and right track assemblies T1, T2 of said track assembly pair T1, T2 comprises a track support beam 10 configured to support a plurality of road wheels, not shown in FIG. 2, a drive wheel member DW, and a drive arrangement D for operating said drive wheel member DW. The left track assembly T1 comprises a track support beam 10 configured to support a plurality of road wheels, a drive wheel member DW, and a drive arrangement D. The right track assembly T2 comprises a track support beam 10 configured to support a plurality of road wheels, a drive wheel member DW, and a drive arrangement D. The left and right track assemblies T1, T2 of said track assembly pair T1, T2 comprises an endless track E being disposed around said road wheels and drive wheel member DW. The track support beam 10 of the respective track assembly T1, T2 has a longitudinal extension configured to run in the longitudinal extension of the vehicle V, when the track assembly is assembled to the vehicle body B.

According to an aspect of the present disclosure, e.g. as illustrated in FIG. 3A, the suspension arrangement S1, S2 has a leaf spring configuration. The suspension arrangement S1, S2 according to the embodiment illustrated in FIG. 3A has a According to an aspect of the present disclosure, said suspension device S1, S2 comprises a front leaf spring element S1 being transversally arranged relative to the longitudinal extension of the tracked vehicle V in the front portion of said vehicle between the left track assembly T1 and right track assembly T2. Said front leaf spring element S1 is arranged between said left and right track assemblies T1, T2 in connection to the track support beam 10 of the respective track assembly T1, T2. Said front leaf spring element S1 is connected in a first end portion to the track support beam 10 of the left track assembly T1 and connected in an opposite second end portion to the track support beam 10 of the right track assembly. The first end portion of the front leaf spring element S1 is connected to a front part of the track support beam 10 of the left track assembly T1 in connection to said drive wheel member and drive arrangement D of the left track assembly T1. The second end portion of the front leaf spring element S1 is connected to a front part of the track support beam 10 of the right track assembly T2 in connection to said drive wheel member and drive arrangement of the right track assembly T1.

According to an aspect of the present disclosure, said front leaf spring element S1 has a U-shaped configuration S1A having double bending portions/transitions with double bending portions configured to be arranged in connection to the respective side of the vehicle body, and an under portion arranged to run underneath the vehicle body, the vehicle body not being shown in FIG. 3A. The front leaf spring element S1 comprises a first attachment member S1-1 arranged in connection to a first bending portion and a second attachment member S1-2 arranged in connection to an opposite second bending portion of the U-shaped configuration S1A. Said first attachment member S1-1 and second attachment member S1-2 are configured to provide attachment for said vehicle body, not shown in FIG. 3A. The U-shaped configuration S1A is further configured to laterally project from each side of the vehicle body and being attached to the track support beam 10 of the left and right track assembly T1, T2.

According to an aspect of the present disclosure, said suspension device S1, S2 comprises a rear leaf spring element S2 being transversally arranged relative to the longitudinal extension of the tracked vehicle V in the front portion of said vehicle between the left track assembly T1 and right track assembly T2. Said rear leaf spring element S2 is arranged between said left and right track assemblies T1, T2 in connection to the track support beam 10 of the respective track assembly T1, T2. Said rear leaf spring element S2 is connected in a first end portion to the a rear part of track support beam 10 of the left track assembly T1 and connected in an opposite second end portion to a rear part of the track support beam 10 of the right track assembly.

According to an aspect of the present disclosure, said rear leaf spring element S2 has a U-shaped configuration S2A having double bending portions/transitions with double bending portions configured to be arranged in connection to the respective side of the vehicle body, and an under portion arranged to run underneath the vehicle body, the vehicle body not being shown in FIG. 3A. The rear leaf spring element S2 comprises a first attachment member S2-1 arranged in connection to a first bending portion and a second attachment member S2-2 arranged in connection to an opposite second bending portion of the U-shaped configuration S2A. Said first attachment member S2-1 and second attachment member S2-2 are configured to provide attachment for said vehicle body, not shown in FIG. 3A. The U-shaped configuration S2A is further configured to laterally project from each side of the vehicle body and being attached to the track support beam 10 of the left and right track assembly T1, T2.

According to an aspect of the present disclosure, not shown, said suspension arrangement may comprises a leaf spring arrangement having portions transversally arranged relative to the longitudinal extension of the vehicle, where said leaf spring arrangement comprises L-shaped leaf spring members, each leaf spring member having a first portion attached to the vehicle body, a second portion attached to the track support beam and a transition portion there between, so that compressive and tensile stresses are located to said transition portion.

Said drive wheel member DW is configured to be rotated about a centre axis Z. The drive arrangement D of the respective track assembly T1, T2 is configured to be coaxially arranged relative to said centre axis Z of said drive wheel member DW. The drive arrangement D of the respective track assembly T1, T2 has a main direction of extension essentially orthogonal to the longitudinal direction of said endless track and essentially parallel to the transversal direction of said endless track E.

The drive arrangement D of the respective track assembly T1, T2 comprises a motor device 100 for driving said drive wheel member DW, a transmission device 200 for transferring torque from said motor device 100 to said drive wheel member DW and a brake arrangement 300 for braking the drive wheel member DW. Said motor device 100 may comprise an electric motor or a hydraulic motor. Said motor device 100 is described in more As schematically illustrated in FIG. 2, the drive arrangement D of the respective track assembly T1, T2 may be operably connected to a power supply arrangement 400 for providing power for operating the drive arrangement D the respective track assembly T1, T2. The power supply arrangement 400 may be any suitable power supply arrangement for supplying power to drive arrangement D, i.e. supplying power to motor device 100 of said drive arrangement D.

According to an aspect of the present disclosure, said power supply arrangement 400 may comprise an internal combustion engine. According to an aspect of the present disclosure, the internal combustion engine may be constituted by a diesel engine.

According to an alternative aspect of the present disclosure, said power supply arrangement 400 may comprise an energy supply arrangement such as a battery supply arrangement and/or a fuel cell arrangement, e.g. hydrogen fuel cells.

According to an aspect of the present disclosure, said power supply arrangement 400 may comprise one or more generator units for generating high voltage. One or more control devices, e.g. electronic control units, are provided for controlling, e.g. for each drive arrangement D, said one or more control devices comprising one or more control devices configured to receive high voltage from generator units and transfer said high voltage to drive voltage, i.e. alternating voltage, for said motor device 100 of said drive arrangement D. Said power supply arrangement 400 is according to an aspect of the present disclosure configured to provide a D.C. bus configured to distribute power, i.e. voltage, to e.g. each drive arrangement D.

For a tracked vehicle in the shape of an articulated tracked vehicle having a front vehicle unit and a rear vehicle unit, e.g. as illustrated in FIG. 1B, such a power supply 400 may be arranged in the front vehicle unit or the rear vehicle unit or in both the front vehicle unit and the rear vehicle unit.

Figure 4A:
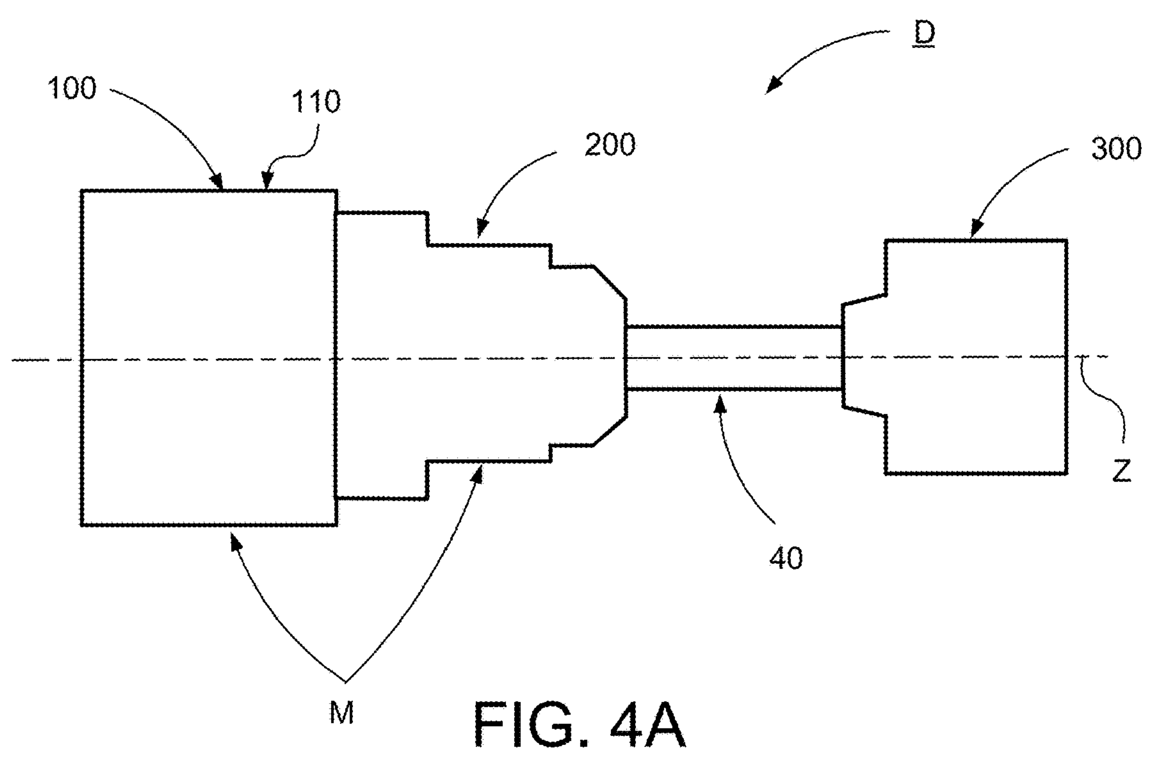
FIG. 4A schematically illustrates a side view of a drive arrangement for a track assembly according to an embodiment of the present disclosure.
Figure 4B:
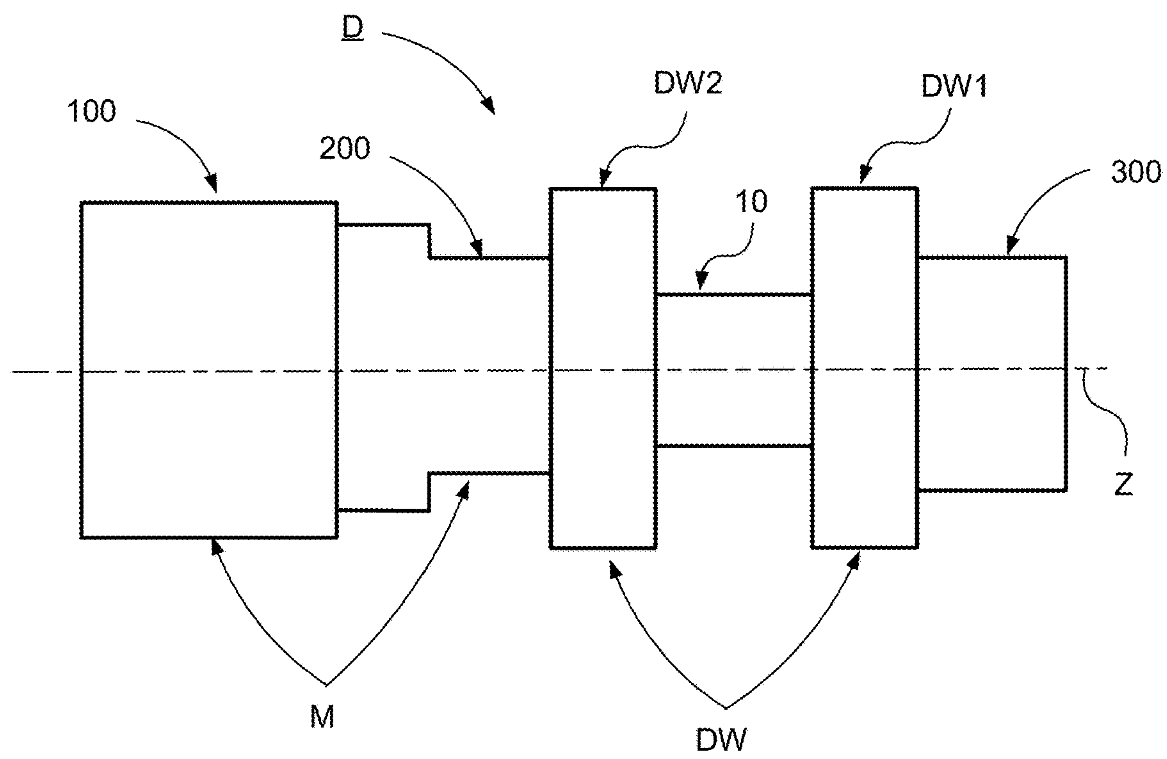
FIG. 4B schematically illustrates a side view of the drive arrangement in FIG. 4A connected to a track support beam of a track assembly and being provided with drive wheel member, according to an embodiment of the present disclosure.

FIG. 4A schematically illustrates a side view of said drive arrangement D and FIG. 4B schematically illustrates a side view of said drive arrangement D supported by said track support beam 10 according to an aspect of the present disclosure.

In FIG. 4B, said drive arrangement D is journaled in bearings to said track support beam 10. In FIG. 4B, said drive arrangement D is operably supporting said drive wheel member DW.

Figure 5:
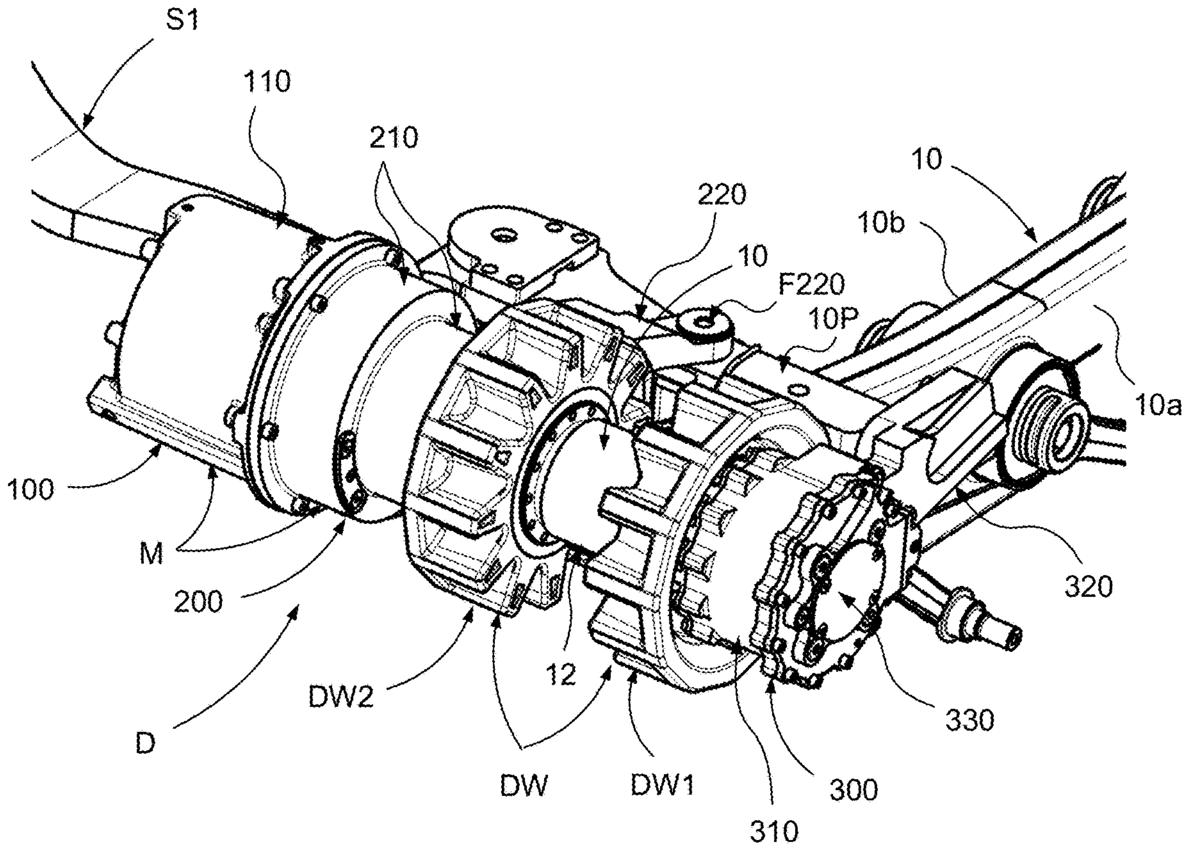
FIG. 5 schematically illustrates a perspective view of a drive arrangement connected to a track support beam of a track assembly and being provided with drive wheel member, according to an embodiment of the present disclosure.

FIG. 5 schematically illustrates a perspective view of said drive arrangement D journaled in bearings to said track support beam 10, operably supporting said drive wheel member DW.

Said drive arrangement D is thus configured to be journaled in bearings in said track support beam 10 for allowing rotation of said drive wheel member DW relative to said track support beam 10 and for supporting said drive arrangement D.

As illustrated in FIG. 2 and FIG. 5, said track support beam 10 has an outer side 10*a* configured to face away from the vehicle body B and an opposite inner side 10*b* configured to face towards said vehicle body when the track assembly is connected to said vehicle body B. Herein, when referring to said track support beam 10 having an outer side 10*a* configured to face away from the vehicle body B and an opposite inner side 10*b* configured to face towards said vehicle body when the track assembly is connected to said vehicle body B, it refers to a portion of the vehicle body B, e.g. vehicle chassis, arranged between the right and left track assembly and hence right and left drive wheel member. Thus, said track support beam 10 has an outer side 10*a* facing in a transversal direction of the vehicle V, and transversal direction relative to its longitudinal extension, outwardly away from the opposite track assembly and, and an opposite inner side 10*b* facing in a transversal direction of the vehicle V, and transversal direction relative to its longitudinal extension, inwardly towards the opposite track assembly.

As schematically illustrated in FIG. 2, the outer side 10*a* of the track support beam 10 of the left track assembly T1 of the tracked vehicle V is configured to face away from the right track assembly T2 of the tracked vehicle V. As schematically illustrated in FIG. 2, the outer side 10*a* of the track support beam 10 of the right track assembly T2 of the tracked vehicle V is configured to face away from the left track assembly T1 of the tracked vehicle V.

As schematically illustrated in FIG. 2, the inner side 10*b* of the track support beam 10 of the left track assembly T1 of the tracked vehicle V is configured to face the right track assembly T2 of the tracked vehicle V. As schematically illustrated in FIG. 2, the inner side 10*b* of the track support beam 10 of the right track assembly T2 of the tracked vehicle V is configured to face the left track assembly T1 of the tracked vehicle V.

Said drive wheel member DW comprises an outer drive wheel DW1 arranged in connection to the outer side of the track support beam 10 and an inner drive wheel DW2 arranged in connection to the inner side of the track support beam 10.

Figure 6:
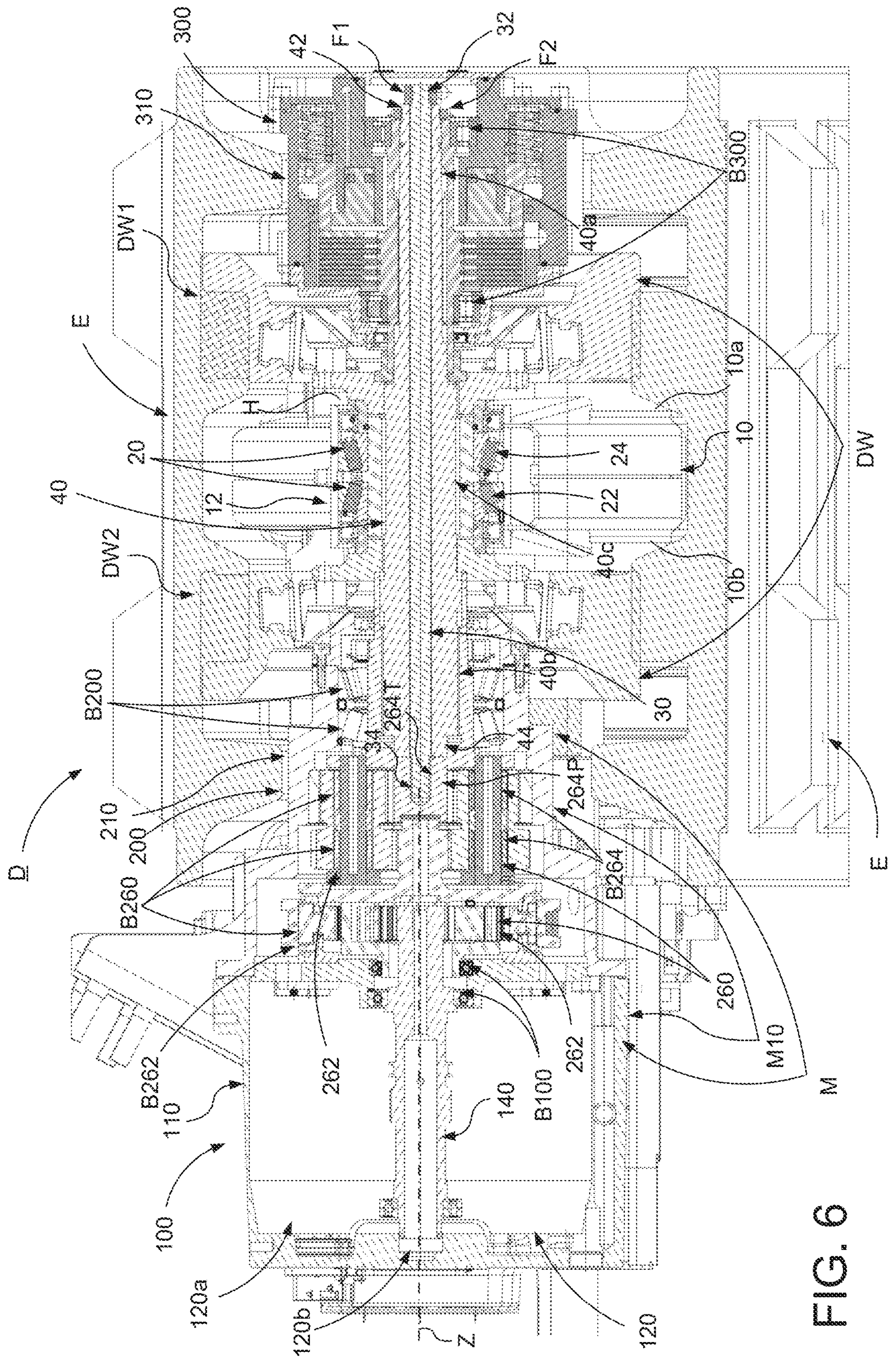
FIG. 6 schematically illustrates a cross sectional view of the drive arrangement in FIG. 5, connected to a track support beam of a track assembly and being provided with drive wheel member, according to an embodiment of the present disclosure.

FIG. 6 schematically illustrates a cross sectional view of said drive arrangement D supported by said track support beam 10 according to an aspect of the present disclosure. The cross section is in the axial direction, i.e. the direction of the axis Z. Said drive arrangement D is journaled in bearings to said track support beam 10.

Said drive arrangement D comprises a drive axle 40 for driving said drive wheel member DW. Said drive wheel member DW is configured to be operably connected to said drive axle 40. Said drive wheel member DW is according to an aspect of the present disclosure configured to be connected to said drive axle 40 by means of a splines connection.

The track assembly for the respective drive arrangement D comprises a bearing configuration 20 arranged in said track support beam 10 for providing bearing of said drive arrangement D. Said drive arrangement D is thus associated with said bearing configuration 20. According to an aspect of the present disclosure, the track support beam 10 has a front portion 12 in which said bearing configuration 20 is configured to be arranged. According to an aspect of the present disclosure, the front portion 12 of the track support beam 10 has a through hole H. The centre of said through hole H will correspond to the centre axis Z when the drive arrangement D and drive wheel member DW is connected to the track support beam 10.

Said track assembly for the respective drive arrangement D thus comprises a bearing configuration 20 arranged in said track support beam 10. Said drive arrangement D is thus configured to be journaled in bearings of said bearing configuration. Thus, said drive arrangement is configured to be journaled in bearings in said track support beam 10 by means of said bearing configuration 20. Said drive arrangement D is configured to be suspended by means of said bearing configuration 20 arranged in said track support beam 10. Said bearing configuration 20, arranged in said track support beam 10, is configured to support said drive arrangement D. According to an aspect of the present disclosure, said bearing configuration 20 is configured to be arranged in connection to said through hole H for facilitating said rotation and support of said drive wheel member D.

FIG. 9A schematically illustrates the cross sectional view of the front portion 12 of the track support beam 10 with the bearing configuration 20 arranged within said front portion, and with a cross section of the drive axle 40 journaled in bearings of said bearing configuration 20 and running through said through opening H of said front portion 12, according to an aspect of the present disclosure. FIG. 9*b*B schematically illustrates a cross sectional view and FIG. 9C a side view of the front portion 12 of the track support beam 10, according to an aspect of the present disclosure.

The bearing configuration 20 is configured to be arranged in said through hole H of the front portion 12 of the track support beam 10. According to an aspect of the present disclosure, said bearing configuration 20 is a tapered roller bearing device.

According to an aspect of the present disclosure, said bearing configuration 20 comprises a first roller bearing 22 and an opposite second roller bearing 24. According to an aspect of the present disclosure, first roller bearing 22 and second roller bearing 24 are arranged in connection to each other within said through hole H of the front portion 12 of the track support beam 10 so as to optimize facilitating tipping torque of said drive arrangement D. According to an aspect of the present disclosure, said first roller bearing 22 and second roller bearing 24 are configured to be arranged in connection to each other within said through hole H of the front portion 12 of the track support beam 10 such that there is a certain pre-tension in said roller bearings 22, 24 of said bearing configuration 20. According to an aspect of the present disclosure, said tapered roller bearing device comprises said first roller bearing 22 and an opposite second roller bearing 24.

As illustrated in FIG. 6 and FIGS. 9A-9C said front portion 12 of the track support beam 10 is configured to provide a bearing housing for said bearing configuration 20. According to an aspect of the present disclosure, said front portion 12 of said track support beam 10 may be denoted bearing housing 12 of said track support beam 10. Said bearing housing 12 may be an integral part of said track support beam 10 or attached to the remaining portion of said track support beam 10. Said remaining portion of said track support beam 10, configured to support road wheels RW and tension wheel TW, as illustrated in e.g. FIGS. 3A-3C, may by denoted road and tension wheel portion 14 of said track support beam 10, schematically illustrated in FIG. 2.

According to an aspect of the present disclosure, the bearing housing 12 has a cylindrical configuration with it centre axis corresponding to the centre axis Z about which said drive wheel member DW is configured to be rotated, here by means of said drive axle 40.

According to an aspect of the present disclosure, the bearing housing 12 has an outer side 120 facing in the orthogonal direction relative to the transversal direction when said track assembly is assembled to the vehicle body of the tracked vehicle. According to an aspect of the present disclosure, the bearing housing 12 has an inner side 12*i* opposite to said outer side 120 providing an inner space corresponding to said through hole H. According to an aspect of the present disclosure, said outer side 120 is a radial outer side 120 and said inner side 12*i* is a radial inner side 12*i*.

According to an aspect of the present disclosure, the bearing housing 12 has an axial outer side 12*a* in connection to an outer side of the opening of the through hole H, said axial outer side 12*a* facing in the same direction as the outer side 10*a* of the track support beam 10, i.e. away from the vehicle body B. According to an aspect of the present disclosure, the bearing housing 12 has an axial inner side 12*b* in connection to an inner side of the opening of the through hole H, said axial side 12*a* facing in the opposite direction as the axial outer side 12*a* and facing in the same direction as the inner side 10*b* of the track support beam 10, i.e. towards the vehicle body B.

Said bearing configuration 20 is configured to be arranged in connection to said inner side 12*i* of said bearing housing 12 as illustrated in FIG. 9A.

Said bearing housing 12, i.e. said front portion 12, of said track support beam 10 comprises a lubrication receiving member 12L for receiving lubrication for said bearing configuration 20.

Said drive axle 40 of the drive arrangement D is configured to run through said through hole H of the front portion 12 of the track support beam 10 in connection to said bearing configuration 20. According to an aspect of the present disclosure, said drive axle 40 of said drive arrangement D is configured to be journaled in bearings of said bearing configuration 20 for allowing rotation of said drive wheel member relative to said track support beam 10 and for supporting said drive arrangement D.

According to an aspect of the present disclosure, the drive axle 40 is configured to be connected to the bearing configuration 20 by means of a splines connection so that said drive axle 40 may be rotated relative to said track support beam 10.

Said drive axle 40 of the drive arrangement D is configured to run through said through hole H of the front portion 12 of the track support beam 10 so that a portion 40*a* of the drive axel 40 is protruding in the axial direction from said through hole in connection to the outer side 10*a* of said track support beam 10. According to an aspect of the present disclosure, said outer drive wheel DW1 is configured to be attached to a portion of the drive axle 40 protruding from the outer side of said track support beam 10.

Said drive axle 40 of the drive arrangement D is configured to run through said through hole H of the front portion 12 of the track support beam 10 so that a portion 40*b* of the drive axel 40 is protruding in the axial direction from said through hole in connection to the inner side 10*b* of said track support beam 10. According to an aspect of the present disclosure, said inner drive wheel DW2 is configured to be attached to a portion of the drive axle 40 protruding from the inner side of said track support beam 10.

According to an aspect of the present disclosure, said drive axle 40 is running transversely relative to the longitudinal extension of said track support beam 10 through said through hole H. According to an aspect of the present disclosure, said drive axle 40 has a transversal extension with a central portion 40*c* configured to be arranged in said through hole and connected to said bearing configuration for said journaling in bearings within the front portion 12 of said track support beam 10.

According to an aspect of the present disclosure, said drive axle 40 with said transversal extension with said central portion 40*c* has an outer extension 40*a* configured to protrude outwardly from said track support beam into said brake arrangement 300. Said drive axle 40 with said transversal extension with said central portion 40*c* has an inner extension 40*b* configured to protrude inwardly from said track support beam into said transmission device 200. Said inner extension 40*b* of said drive axle 40 is thus arranged in connection to said transmission device 200 such that torque from said transmission device 200 is transferred to said drive axle 40.

Said bearing configuration 20 is thus, according to an aspect of the present disclosure, arranged in a through hole H of said track support beam 10, centrally between said outer drive wheel DW1 and inner drive wheel DW2.

Said outer drive wheel DW1 and inner drive wheel DW2 are coaxially arranged relative to each other at a distance along the axis Z from each other, wherein said front portion 12 of said track support beam is arranged between said outer drive wheel DW1 and inner drive wheel DW2 such that said through hole H is arranged between said outer drive wheel DW1 and inner drive wheel DW2 coaxially with said axis Z.

According to an aspect of the present disclosure, said drive arrangement D is supported between said outer drive wheel DW1 and inner drive wheel DW2 in said through hole H of said outer portion 12 of said track support beam 10. Said drive axle 40 of said drive arrangement D is supported between said outer drive wheel DW1 and inner drive wheel DW2 in said through hole H of said outer portion 12 of said track support beam 10.

According to an aspect of the present disclosure, said drive arrangement D is supported between said outer drive wheel DW1 and inner drive wheel DW2 in said through hole H of said outer portion 12 of said track support beam 10 by means of supporting said drive axle 40 of said drive arrangement D with said bearing configuration 20. Said bearing configuration 20 is thus arranged in said through hole H of said track support beam 10, centrally between said outer drive wheel DW1 and inner drive wheel DW2.

As mentioned above, the drive arrangement D comprises a motor device 100 for driving said drive wheel member DW, a transmission device 200 for transferring torque from said motor device 100 to said drive wheel member DW and a brake arrangement 300 for braking the drive wheel member DW.

According to an aspect of the present disclosure, said brake arrangement 300 is configured to be arranged in connection to the outer side 10*a* of said track support beam 10.

According to an aspect of the present disclosure, said transmission device 200 is configured to be arranged in connection to the inner side 10*b* of said track support beam 10 and said motor device 100 is configured to be arranged internally relative to said transmission device 200 so that said transmission device 200 is arranged between the motor device 100 and brake arrangement 300.

Said motor device 100 may comprise an electric motor or a hydraulic motor. Said motor device 100 comprises a motor housing 110 for housing parts associated with said motor device 100. Said motor device 100 comprises a motor 120 for said driving. Said motor 120 is configured to be housed in said housing 110.

According to an aspect of the present disclosure, said motor comprises a stator 120*a* configured to be fixedly connected to said motor housing 110 of said motor 100, and a rotor 120*b* for providing a rotational movement of a motor axle 140 relative to the stator 120*a*.

According to an aspect of the present disclosure, a power supply, e.g. a power supply 400 schematically illustrated in FIG. 2, may be configured to provide power for said motor device 100, i.e. for operating said rotor 120*a* of said motor 120 and hence said motor axle 140.

The motor device comprises a bearing configuration B100 arranged in said motor housing 110 of said motor device 100 for providing bearing of said motor axle 140. According to an aspect of the present disclosure, said bearing configuration B100 is a deep groove ball bearing device. According to an aspect of the present disclosure, the motor axle 140 is configured to be connected to the bearing configuration B100 by means of a splines connection so that said motor axle 140 may be rotated relative to said motor housing 110.

According to an aspect of the present disclosure, said motor axle 140 is configured to be operably connected to said transmission device 200 for transferring torque from said motor axle 140 to said drive axle 40.

According to an aspect of the present disclosure, said transmission device 200 comprises a transmission housing 210 for housing parts associated with said transmission device 200.

Said transmission device 200 of said drive arrangement D comprises a torque arm 220, see e.g. FIG. 5. Said torque arm 220 is configured to provide torque resistance in connection to rotation of said drive axle 40. Said torque arm 220 is configured to be connected to said track support beam 10 so as to essentially prevent rotation of said transmission device 200 about said centre axis Z.

According to an aspect of the present disclosure, said transmission device 200 comprises a gear arrangement 260. Said gear arrangement 260 may be any suitable gear arrangement for transferring torque from the motor device 100 to said drive wheel member DW for driving a track assembly and hence driving the tracked vehicle having said track assembly. According to an aspect of the present disclosure, said gear arrangement 260 comprises a planetary gear arrangement. According to an aspect of the present disclosure, said motor axle 140 is configured to be operably connected to said gear arrangement 260 of said transmission device 200 for transferring torque from said motor axle 140 to said drive axle 40. According to an aspect of the present disclosure, said gear arrangement 260 of said transmission device 200 is configured to be operably connected to said drive axle for transferring torque from said gear arrangement 260 to said drive axle 40.

The transmission device 200 comprises a bearing configuration B260 arranged for providing bearing of said gear arrangement 260. According to an aspect of the present disclosure, said bearing configuration B260 is a needle roller bearing device.

According to an aspect of the present disclosure, said gear arrangement 260 may comprise a first planetary gear configuration 262. Such a first planetary gear configuration 262 may comprise a high/low planetary gear member configured to provide a high gear position in connection to transferring torque from the motor device 100. According to an aspect of the present disclosure, said gear arrangement 260 may comprise a second planetary gear configuration 264. Such a second planetary gear configuration 264 may comprise a set of planetary gears for providing gear change of said drive wheel member in connection to transferring torque from the first planetary gear configuration 262 to the drive wheel member DW. The first planetary gear configuration 262 is configured to provide a high gear position in connection to transferring torque to said second planetary gear configuration 264, providing no change in speed from the motor 100, and a low gear position configured to reduce the speed of the motor in connection to transferring torque to said second planetary gear configuration 264.

The transmission device 200 comprises a bearing configuration B260 arranged for providing bearing of said gear arrangement 260, see FIG. 6. The first planetary gear configuration 262 comprises a first bearing configuration B262. According to an aspect of the present disclosure, said first bearing configuration B262 is a needle roller bearing device. The second planetary gear configuration 262 comprises a second bearing configuration B264. According to an aspect of the present disclosure, said second bearing configuration B264 is a needle roller bearing device.

Said transmission device 200 is configured to transfer said torque from said motor device 100 to said drive wheel member DW via said drive axle 40 by means of said gear arrangement 260.

According to an aspect of the present disclosure, said drive axle 40 is configured to run from said transmission device through the inner drive wheel DW2, through the through hole H of said track support beam 10 in connection to said bearing configuration 20, through said outer drive wheel DW1 and further through a major portion of said brake arrangement 300.

Said motor device 100 and transmission device 200 are comprised in a drive unit M. Said drive arrangement D thus comprises a drive unit M comprising said motor device 100 and transmission device 200. Said motor device 100 and transmission device 200 of the drive arrangement D thus provides a drive unit M. The drive unit M comprises a housing configuration M10. Said housing configuration M10 comprises said motor housing 110 and said transmission housing 210.

Said drive unit M is configured to be pivotably journaled in bearings in connection to a portion of the drive axle 40 configured to protrude from the inner side 10*b* of said track support beam 10 so as to allow rotation of the drive axle 40 relative to said housing configuration M10 of said drive unit M. The bearing configuration B200 is configured to be arranged around said portion of said drive axle 40 configured to protrude from the inner side 10*b* of said track support beam 10.

The drive arrangement D comprises a bearing configuration B200 arranged in said housing configuration of said drive unit M, here in connection to the transmission housing 210, for providing bearing of said drive unit M. According to an aspect of the present disclosure, said bearing configuration B200 is a tapered roller bearing device.

According to an aspect of the present disclosure, the drive axle 40 is configured to be connected to the bearing configuration B200 by means of a splines connection so that said drive axle 40 may be rotated relative to said housing configuration, i.e. said transmission housing 210.

According to an aspect of the present disclosure, the drive arrangement D comprises a centre support bar 30 coaxially arranged within said drive arrangement D. Said centre support bar 30 is configured to run in the axial direction, i.e. in the direction of said axis Z. Said centre support bar 30 is configured to run transversely relative to the longitudinal extension of said track support beam 10.

Said centre support bar 30 is configured to supportingly connect said transmission device 200 and brake arrangement 300. Said centre support bar 30 is configured to supportingly connect said drive unit M and brake arrangement 300.

Said centre support bar 30 is configured to coaxially coincide with the centre axis Z of said drive wheel member DW.

Said centre support bar 30 is configured to run through said drive axle 40 so as to provide said connection of said transmission device 200 and brake arrangement 300. Said centre support bar 30 is configured to run through said drive axle 40 so as to provide said connection of said drive unit M and brake arrangement 300. Said centre support bar 30 is configured to be axially movable within said drive axle 40 so as to facilitate providing axial force for connecting said transmission device 200 and brake arrangement 300. Said centre support bar 30 is configured to be axially movable within said drive axle 40 so as to facilitate providing axial force for connecting said drive unit M and brake arrangement 300.

Said drive axle 40 has a first end portion 42 and an opposite second end portion 44. Said first end portion 42 is arranged at the end of said portion 40*a* of the drive axle 40 protruding in the axial direction from the through hole H of the track support beam 10 in connection to the outer side 10*a* of said track support beam 10. Said second end portion 44 is arranged at the end of said portion 40*b* of the drive axle 40 protruding in the axial direction from the through hole H of the track support beam 10 in connection to the inner side 10*b* of said track support beam 10.

According to an aspect of the present disclosure, said centre support bar 30 has a first end portion 32 configured to protrude from the first end portion 42 of the drive axle 40 and an opposite second end portion 34 configured to protrude from the second end portion 44 of the drive axle 40.

According to an aspect of the present disclosure, said centre support bar 30 is configured to run through said drive axle 40 so as to provide said connection of said transmission device 200 and brake arrangement 300 by means of connecting said second end portion 34 to said transmission device 200.

According to an aspect of the present disclosure, said second end portion 34 of said centre support bar 30 is configured to provide said connection of said transmission device 200 and brake arrangement 300 by means of connecting said second end portion 34 to said transmission device 200.

According to an aspect of the present disclosure, said second end portion 34 of said centre support bar 30 is configured to provide said connection of said transmission device 200 and brake arrangement 300 by means of connecting said second end portion 34 to a portion 264P of a gear carrier of said transmission device 200 configured to transfer said torque to said drive axle 40.

According to an aspect of the present disclosure, said second end portion 34 of said centre support bar 30 is configured to be connected to said portion 264P of said gear carrier of said transmission device 200 so that it rotates with the same rotational speed as said portion 264P of said gear carrier and thus rotates with said drive axle 40.

According to an aspect of the present disclosure, said second end portion 34 of said centre support bar 30 comprises or is constituted by a screw joint member configured to be screwed into a threaded opening 264T of said portion 264P of said gear carrier for providing said connection of said centre support bar 30 to said transmission device 200. According to an aspect of the present disclosure, during assembly of said centre support bar 30 for providing said connection of said transmission device 200 and hence said drive unit M, said second end portion 34 of said centre support bar 30 is configured to be screwed screw into said threaded opening 264T by means of its screw joint member. Thus, according to an aspect of the present disclosure, said second end portion 34 of said central support bar 30 is configured to be fastened to said portion 264P of said gear carrier by means of a screw joint configuration. According to the exemplary embodiment illustrated in FIG. 6, said second end portion 34 of said central support 30 bar comprises or is constituted by a screw joint member configured to be screwed into a threaded opening 264T of said portion 264P of said gear carrier for providing said connection. Alternatively the second end portion of said central support bar could be a treaded opening and the portion of said gear carrier could have a protrusion in the shape of a screw joint member for providing connection to said central support bar.

According to an aspect of the present disclosure there is no torque transfer between the centre support bar 30 and the drive axle 40.

Said drive axle 40 thus has a tube configuration. Said drive axle 40 thus has the shape of a tube, providing a through hole for said centre support bar 30. Said drive axle 40 thus has a tube configuration, configured to receive said centre support bar 30. Said drive axle 40 has a hollow configuration for allowing introduction of said centre support bar 30 into said drive axle 40.

Said brake arrangement 300 further comprises a hollow brake axle 340. Said hollow brake axle 340 is coaxially arranged relative to said centre axis Z. Said hollow brake axle 340 is configured to be arranged around said drive axle 40 so that the brake axle 340 is rotated by means of said drive axle 40. Said hollow brake axle 340 is according to an aspect of the present disclosure configured to be connected to said drive axle 40 by means of a splines connection around said drive axle so that the brake axle 340 is rotated by rotation of said drive axle 40.

Figure 7:
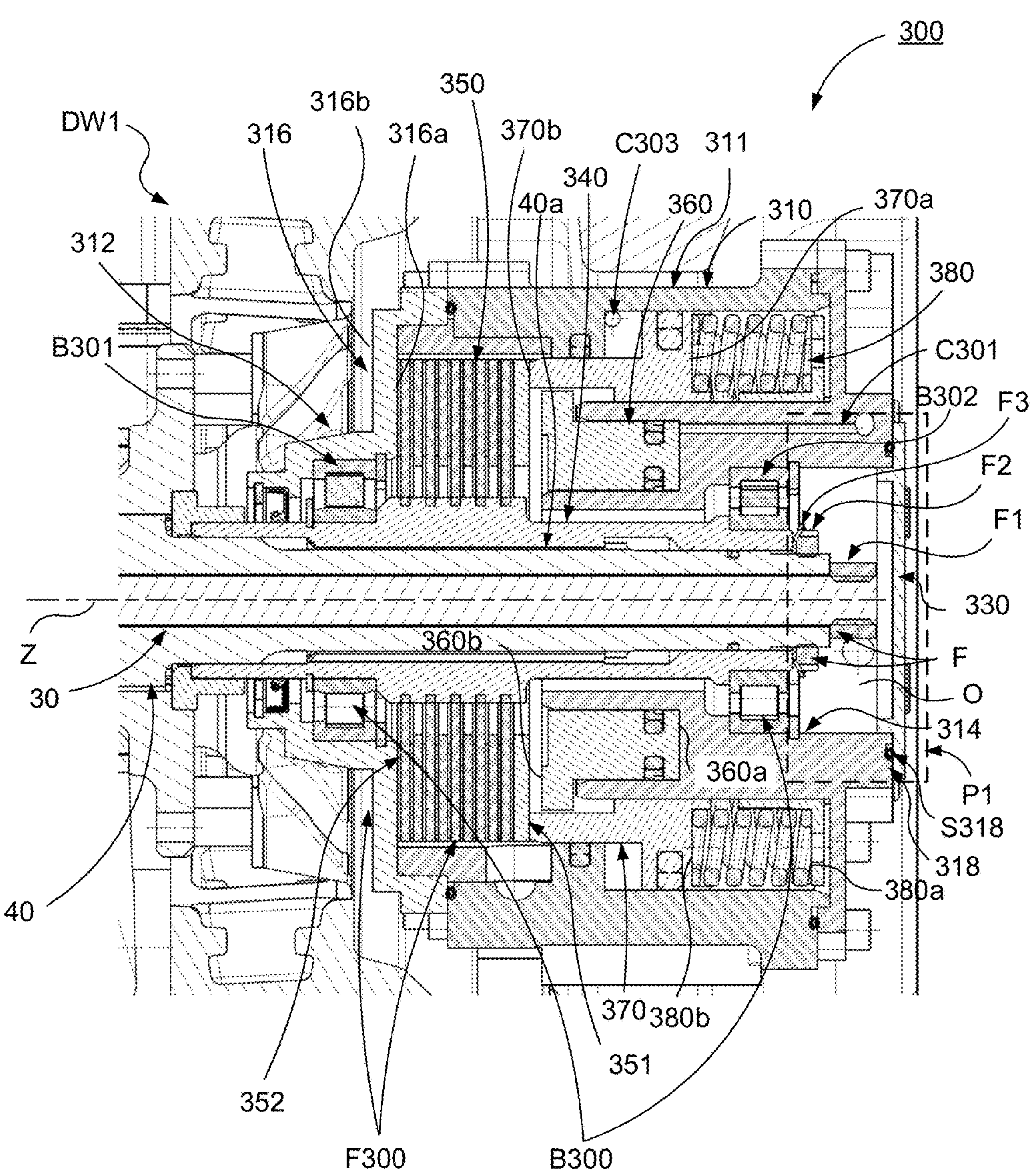
FIG. 7 schematically illustrates a cross sectional view of a brake arrangement of the drive arrangement in FIG. 6, according to an embodiment of the present disclosure.
Figure 8:
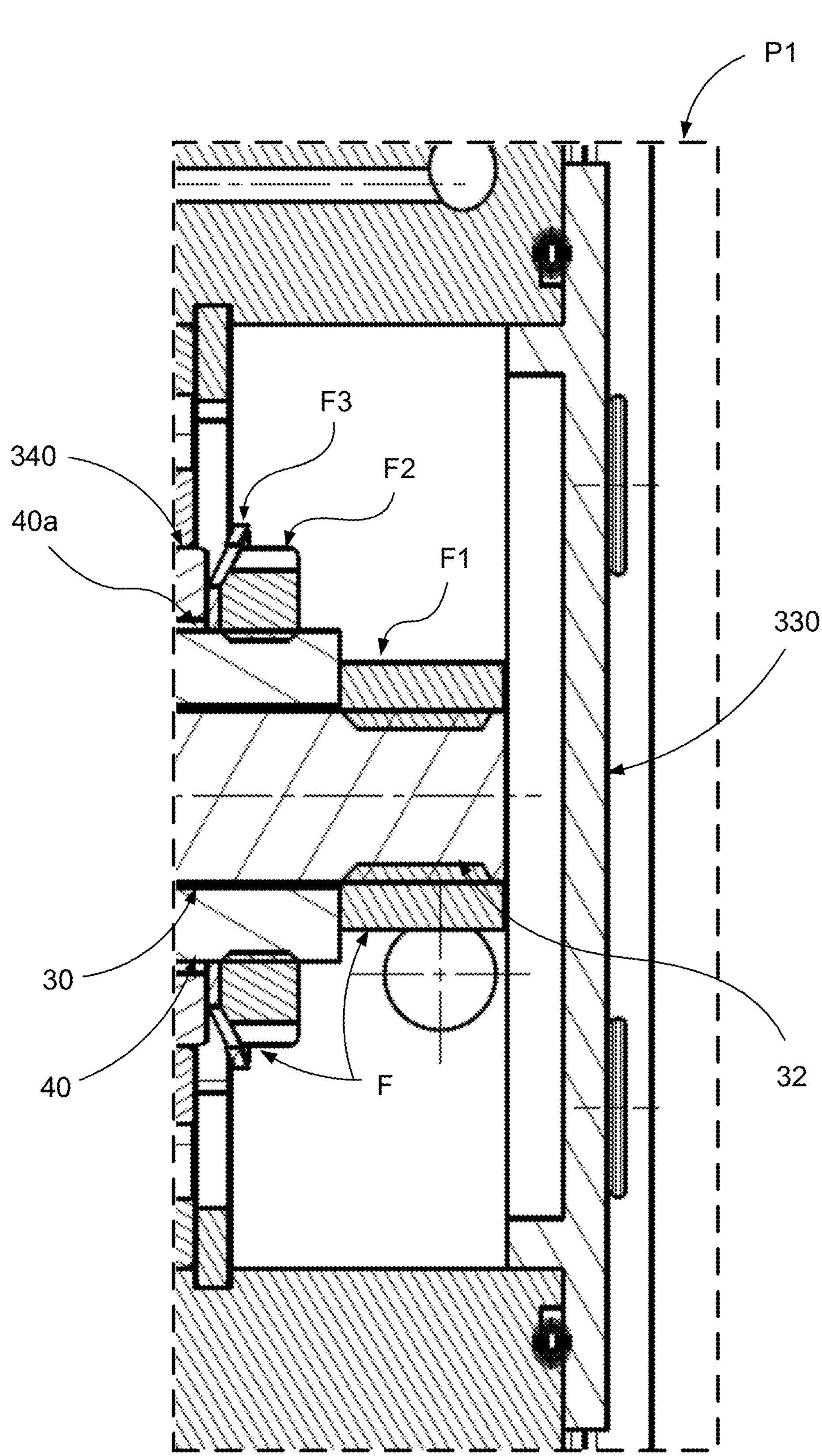
FIG. 8 schematically illustrates an end portion of the cross sectional view of the brake arrangement in FIG. 7, according to an embodiment of the present disclosure.

According to an aspect of the present disclosure, a fastening arrangement F is provided for facilitating assembly and disassembly of said drive arrangement D, see FIG. 7 and FIG. 8, FIG. 8 showing an end portion P1 of the cross section of the brake arrangement 300 in FIG. 7.

Said fastening arrangement F is configured to be arranged in connection to an outer end portion of said brake arrangement 300 so as to facilitate assembly and disassembly of said drive arrangement D associated with said brake arrangement 300.

Said fastening arrangement F is configured to axially hold said centre support bar 30 in connection to said drive axle 40 so as to facilitate connecting said transmission device 200 and brake arrangement 300. Said fastening arrangement F is configured to axially hold said centre support bar 30 in connection to said drive axle 40 so as to facilitate connecting said drive unit M and brake arrangement 300.

According to an aspect of the present disclosure, said fastening arrangement F comprises a first fastening member F1 configured to provide attachment of said centre support bar 30 when arranged through said drive axle 40. Said centre support bar 30 is configured to be removably attached by means of said first fastening member F1. Said first fastening member F1 is according to an aspect of the present disclosure a joint member, e.g. a bolt joint member, configured to be attached to an end portion 32 of said centre support bar 30. Said end portion 32 of said centre support bar 30 is configured to protrude from said end portion 42 of said hollow drive axle 40.

According to an aspect of the present disclosure, said centre support bar 30 is configured to be removably attached by means of said first fastening member F1. According to an aspect of the present disclosure, said first fastening member F1 is arranged in connection to an outer end portion of said brake arrangement 300 so as to provide connection of said drive arrangement D and so as to facilitate assembly of said drive arrangement D to said track support beam 10 and disassembly of said drive arrangement D from said track support beam 10.

According to an aspect of the present disclosure, said first fastening member F1, when said central support bar 30 is connected to said transmission arrangement, provides tension in connection to said central support bar 30 so that connection of said drive arrangement D, i.e. said drive unit M and brake arrangement 300 is facilitated.

According to an aspect of the present disclosure, said first fastening member F1, when said second end portion 34 of said central support bar 30 is configured to provide connection to said transmission arrangement by means of a screw joint arrangement providing a screwed connection between said portion 264P of said gear arrangement 260 and said second end portion 34 of said central support bar 30, provides tension in connection to said central support bar 30 so that said drive arrangement D comprising said bearing configuration 20 is pulled together for easy and efficient connection.

According to an aspect of the present disclosure, said fastening arrangement F comprises a second fastening member F2 configured to be arranged around said drive axle 40 so as to provide a locking function for preventing axial movement of the brake arrangement 300. Said second fastening member F2 is configured to be arranged around said drive axle 40 at an end portion of the portion 40*a* of the drive axle protruding in the axial direction outwardly from said outer side 10*a* of said track support beam 10.

According to an aspect of the present disclosure, said second fastening member F2 is configured to be arranged around said drive axle 40 in connection to the brake axle 340 so as to provide a locking function for preventing axial movement of the brake axle 340.

According to an aspect of the present disclosure, said fastening arrangement F comprises a third fastening member F3 configured to be arranged around said drive axle 40 in connection to said second fastening member F2. According to an aspect of the present disclosure, said third fastening member F3 configured to be arranged around said drive axle 40 between an end portion of said brake axle 340 and said second fastening member F2.

According to an aspect of the present disclosure, said second fastening member F2 is ring-shaped and comprises a set of locking recesses distributed around its circumference. According to an aspect of the present disclosure, said third fastening member F3 is ring-shaped and comprises a set of projecting and bendable locking elements distributed around its circumference, locking elements of said set of locking elements being configured to, when bended towards said second fastening member F2, fit in recesses of said second fastening member F2.

Said brake arrangement 300 comprises a brake housing 310 for brake parts associated with said brake device 300. The brake arrangement 300 comprises said brake housing 310 configured to provide an enclosure for brake members of said brake arrangement 300.

As schematically illustrated in FIG. 8, said brake housing 310 has a first end portion 316 configured to face said track support beam 10 and an opposite second end portion 318 configured to face away from said track support beam 10.

Said second end portion 318 has a central opening O for accessing said fastening arrangement F so as to facilitate assembly of said brake arrangement 300 to said track assembly and disassembly of said brake arrangement 300 from said track assembly.

According to an aspect of the present disclosure, the brake arrangement 300 comprises a closure element 330 for closing said opening O. Said closure element 330 is operable between an open position for facilitating access to said fastening arrangement F, and a closed position in which said enclosure is provided.

According to an aspect of the present disclosure, a sealing member S318 is configured to be provided in connection to said end portion 318 at said opening O so as to provide sealing of said closure element 330 in the closed position of said closure element 330. According to an aspect of the present disclosure, said sealing member S318 is an O-ring member.

According to an aspect of the present disclosure, a sealing member is arranged in connection to the track support beam 10, i.e. outer side 10*a* of said track support beam 10, configured to provide sealing against said brake axle 340.

Said brake arrangement 300 is configured to be journaled in bearings in connection to an outer portion 40*a* of the drive axle 40 protruding in the axial direction from the outer side 10*a* of said track support beam 10. Said brake housing 310 is configured to be journaled in bearings to said brake axle 340 such that said journaling in bearings in connection to said outer portion 40*a* of the drive axle 40 is provided when said brake arrangement 300 is connected to said drive axle 40.

Said brake device 300 comprises a bearing configuration B300 for providing said journaling in bearings of said brake housing 310 in connection to said brake axle 340. Said bearing configuration B300 is arranged in said brake housing 310 of said brake arrangement 300.

Said bearing configuration B300 comprises a first bearing member B301 and a second bearing member B302 arranged at an axial distance from said first bearing member B301. One of said first bearing member B301 and second bearing member B302 is provided with a flange configuration for holding the brake housing 310 in the axial direction and the other of said first bearing member B301 and second bearing member B302 is configured to allow certain axial movement of said housing 310 relative to said brake axle 340.

In the exemplary embodiment schematically illustrated in FIG. 8, the first bearing member B301 is configured to allow certain axial movement of said housing 310 relative to said brake axle 340. In the exemplary embodiment schematically illustrated in FIG. 8, the second bearing member B302 is provided with a flange configuration for holding the brake housing 310 in the axial direction.

Said first bearing member B301 is arranged in connection to a first support portion 312 of said brake housing 310. Said second bearing member B302 is arranged in connection to a second support portion 314 of said brake housing 310, axially opposite to said first support portion 312. According to an aspect of the present disclosure said first bearing member B301 is a cylindrical roller bearing member. According to an aspect of the present disclosure said second bearing member B302 is a cylindrical roller bearing member.

According to an aspect of the present disclosure, said brake arrangement 300 comprises a torque arm 320 configured to be connected to said track support beam 10 so as to essentially prevent rotation of said brake arrangement 300 about said centre axis Z. According to an aspect of the present disclosure, said torque arm 320 is configured to be attached to or constitute a portion of said brake housing 310. Said torque arm 320 is configured to be connected to said track support beam 10 so as to essentially prevent rotation of said brake housing 310 about said centre axis Z.

According to an aspect of the present disclosure, said torque arm 320 is configured to provide torque resistance in connection to a brake action of said brake arrangement 300 on said drive axle 40.

According to an aspect of the present disclosure, said torque arm 320 is configured to be movably connected to said track support beam 10 such that the movement of the torque arm 320 and hence brake arrangement 300 relative to said track support beam 10 is a controlled movement in the longitudinal direction of said endless track E.

According to an aspect of the present disclosure, said movable connection of said torque arm 320 to said track support beam 10 is arranged to be provided by means of a pin member 10P arranged in connection to one of said track support beam 10 and torque arm 320 and an oval recess arranged in connection to the other of said of said track support beam 10 and torque arm 320. According to an aspect of the present disclosure, said pin member 10P is connected to said oval recess such that said movement of the torque arm 320 and hence brake arrangement 300 relative to said track support beam 10 in the longitudinal direction of said endless track E, and thus longitudinal direction of said track support beam 10, is facilitated. According to an aspect of the present disclosure, said oval recess is configured to facilitate controlled movement of the torque arm 320 relative to said track support beam 10 in the longitudinal direction of said track support beam 10. According to an aspect of the present disclosure, said oval recess is configured to facilitate guided movement of the pin member 10P and hence torque arm 320 relative to said track support beam 10 in the longitudinal direction of said track support beam 10.

According to an aspect of the present disclosure, said pin member 10P is configured to be fixedly attached in one end to said track support beam 10 and connected to said oval recess in the opposite end such that movement of the torque arm 320 and hence brake arrangement 300 relative to said track support beam 10 in the longitudinal direction of said endless track E is facilitated and movement in the vertical direction is impeded, i.e. essentially prevented.

According to an aspect of the present disclosure, said brake arrangement 300 comprises a set of friction elements 350, illustrated in FIG. 7 arranged within said brake housing 310. According to an aspect of the present disclosure, said set of friction elements 350 are configured to be arranged about said hollow brake axle 340, being arranged about said drive axle 40. According to an aspect of the present disclosure, said brake arrangement 300 further comprises a service brake piston device 360 arranged in connection to and configured to act on said set of friction elements 350 based on a brake action of said tracked vehicle for service brake function. According to an aspect of the present disclosure, said brake arrangement 300 further comprises a parking brake piston device 370 arranged in connection to said set of friction elements 350 and in connection to a spring device 380, wherein said spring device is configured to act on said parking brake piston device 370, which in turn acts on said friction elements 350 based on a parking brake action of said tracked vehicle for parking brake function.

The foregoing description of the preferred embodiments of the invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling other skilled in the art to understand the invention for various embodiments and with the various modifications as are suited to the particular use contemplated.

The invention claimed is:

1. A track assembly for a tracked vehicle, said track assembly being configured to be connected to a vehicle body of said vehicle, said track assembly comprising a track support beam configured to support a plurality of road wheels, a drive wheel member, and a drive arrangement for operating said drive wheel member, said drive wheel member being configured to be rotated about a centre axis, an endless track being disposed around said road wheels and drive wheel member, said drive arrangement comprising a drive unit for driving said drive wheel member, and a brake arrangement for providing a braking function of the drive wheel member of the track assembly, wherein said track support beam has an outer side configured to face away from the vehicle body and an opposite inner side configured to face towards said vehicle body when said track assembly is connected to the vehicle body, wherein said drive arrangement comprises a drive axle being configured to be coaxially arranged relative to said centre axis of said drive wheel member for rotating said drive wheel member, wherein said drive arrangement comprises a centre support bar configured to coaxially coincide with the centre axis of said drive wheel member, said centre support bar being configured to supportingly connect said brake arrangement with said drive unit, wherein said brake arrangement is configured to be journaled in bearings in connection to an outer portion of the drive axle protruding from the outer side of said track support beam.

2. The track assembly of claim 1, wherein said drive axle is configured to be journaled in bearings in said track support beam so as to allow rotation of said drive wheel member relative to said track support beam, wherein said drive axle is configured to run through said track support beam, to the outer side, providing said outer portion of the drive axle.

3. The track assembly of claim 1, wherein said brake arrangement comprises a torque arm configured to be connected to said track support beam so as to essentially prevent rotation of said brake arrangement about said centre axis.

4. The track assembly of claim 3, wherein said torque arm is configured to provide torque resistance in connection to a brake action associated with said drive axle by means of said brake arrangement.

5. The track assembly of claim 1, wherein said centre support bar is configured to run through said drive axle so as to coaxially provide said connection of said drive unit and brake arrangement.

6. The track assembly of claim 5, wherein said drive axle has an inner portion protruding from the inner side of said track support beam into a transmission device of said drive unit, wherein said centre support bar running through said drive axle is configured to be connected to said transmission device.

7. The track assembly of claim 1, further comprising a fastening arrangement configured to be arranged in connection to an outer end portion of said brake arrangement so as to facilitate assembly and disassembly of said drive arrangement associated with said brake arrangement.

8. The track assembly of claim 7, wherein said fastening arrangement comprises a first fastening member configured to provide attachment of said centre support bar when arranged through said drive axle, said centre support bar being configured to be removably attached by means of said fastening member.

9. The track assembly of claim 7, wherein said fastening arrangement comprises a second fastening member configured to be arranged around said drive axle so as to provide a locking function for preventing axial movement of the brake arrangement.

10. The track assembly of claim 7, wherein the brake arrangement comprises a brake housing configured to provide an enclosure for brake members of said brake arrangement, said housing having a first end portion configured to face said track support beam and an opposite second end portion configured to face away from said track support beam, said second end portion having a central opening for accessing said fastening arrangement so as to facilitate assembly of said brake arrangement to said track assembly and disassembly of said brake arrangement from said track assembly.

11. The track assembly of claim 10, wherein the brake arrangement comprises a closure element for closing said opening, said closure element being operable between an open position for facilitating access to said fastening arrangement, and a closed position in which said enclosure is provided.

12. The track assembly of claim 10, said brake arrangement further comprising a hollow brake axle configured to be arranged around said drive axle so that the brake axle is rotated by means of said drive axle, wherein said brake housing is configured to be journaled in bearings to said brake axle such that said journaling in bearings in connection to said outer portion of the drive axle is provided when said brake arrangement is connected to said drive axle.

13. The track assembly of claim 1, wherein the brake arrangement, in the direction essentially perpendicular to the longitudinal direction and the transversal direction of the endless track is configured to be arranged within the periphery of the endless track.

14. The track assembly of claim 1, wherein said drive arrangement is configured to be coaxially arranged relative to said centre axis of said drive wheel member.

15. The track assembly of claim 1, wherein said drive wheel member comprises an outer drive wheel arranged in connection to the outer side of the track support beam and an inner drive wheel arranged in connection to the inner side of the track support beam, wherein said journaling in bearings of said drive axle is centrally arranged, in said track support beam, between said outer drive wheel and inner drive wheel.

16. A tracked vehicle comprising at least one track assembly of claim 1.

17. A tracked vehicle of claim 16, wherein said tracked vehicle comprises a left track assembly, a right track assembly and a vehicle body, wherein said track assemblies are suspendedly arranged to said vehicle body by means of a suspension arrangement.

* * * * *